Sept. 11, 1956　　　M. M. SANDERS ET AL　　　2,762,516
STOCK FEED TROUGH
Filed Feb. 13, 1952　　　　　　　　　　　　5 Sheets-Sheet 1
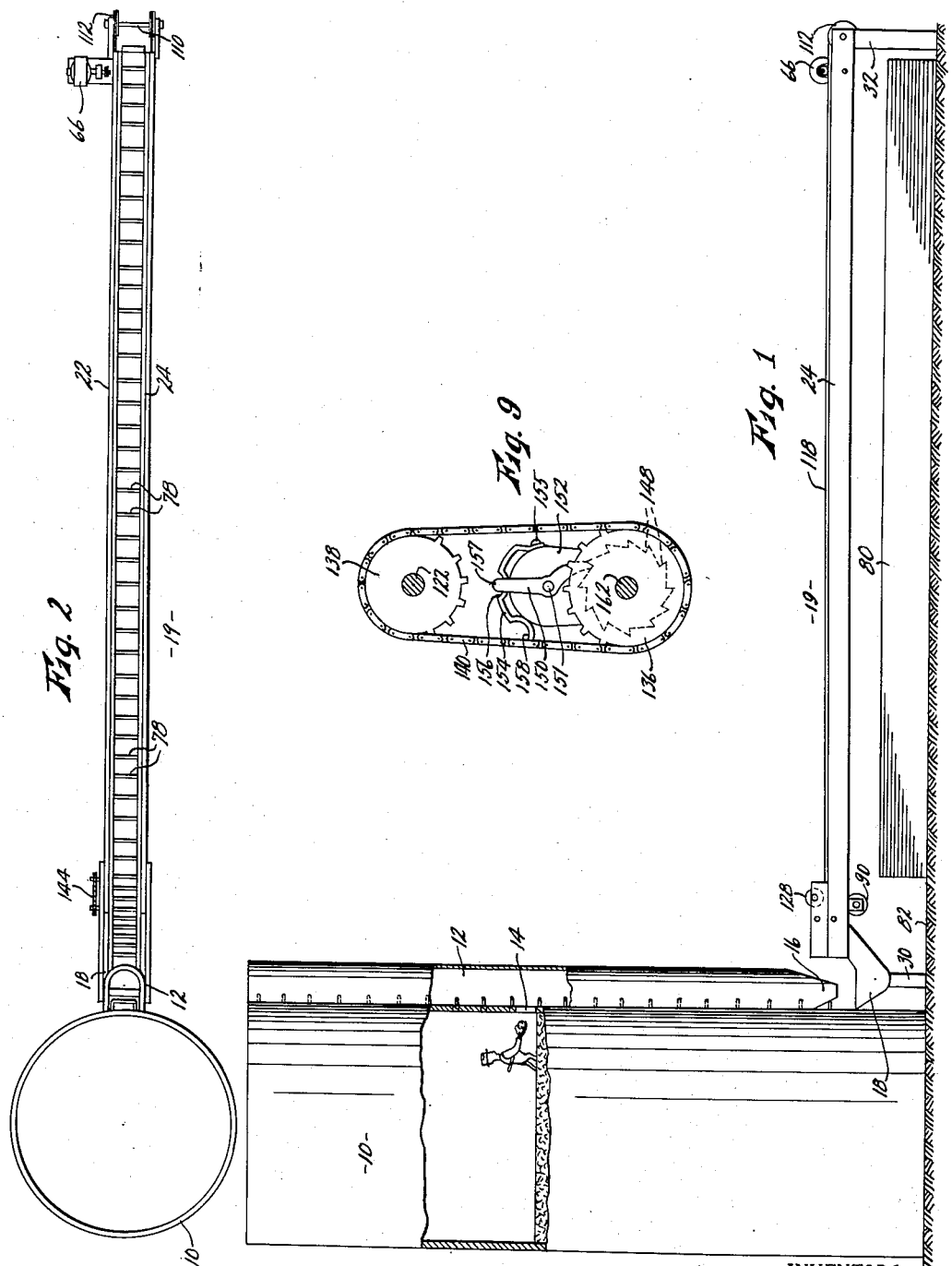
INVENTORS
Everett R. Sanders
Maudie M. Sanders
BY
Hamilton & Hamilton
Attorneys.

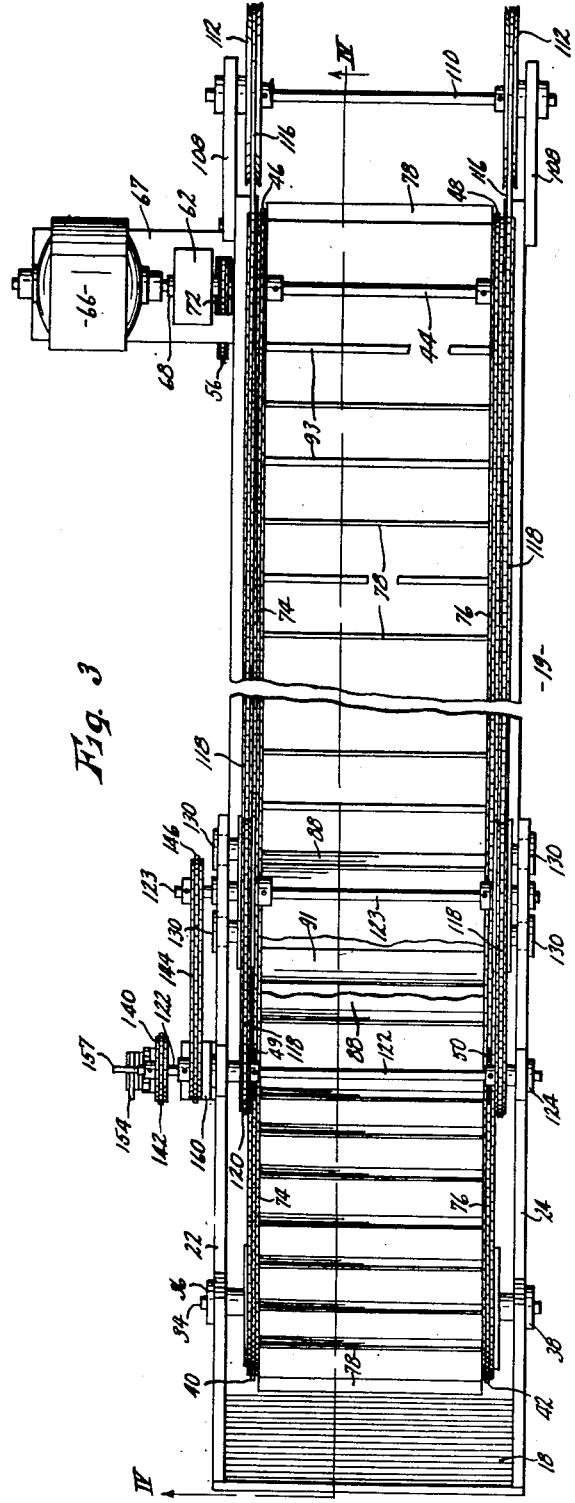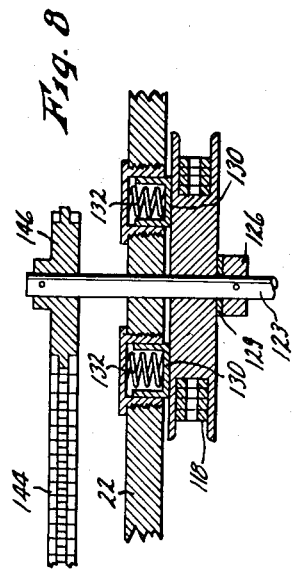

Sept. 11, 1956  M. M. SANDERS ET AL  2,762,516
STOCK FEED TROUGH
Filed Feb. 13, 1952  5 Sheets-Sheet 3

INVENTORS
Everett R. Sanders
Maudie M. Sanders
BY Hamilton & Hamilton
Attorneys.

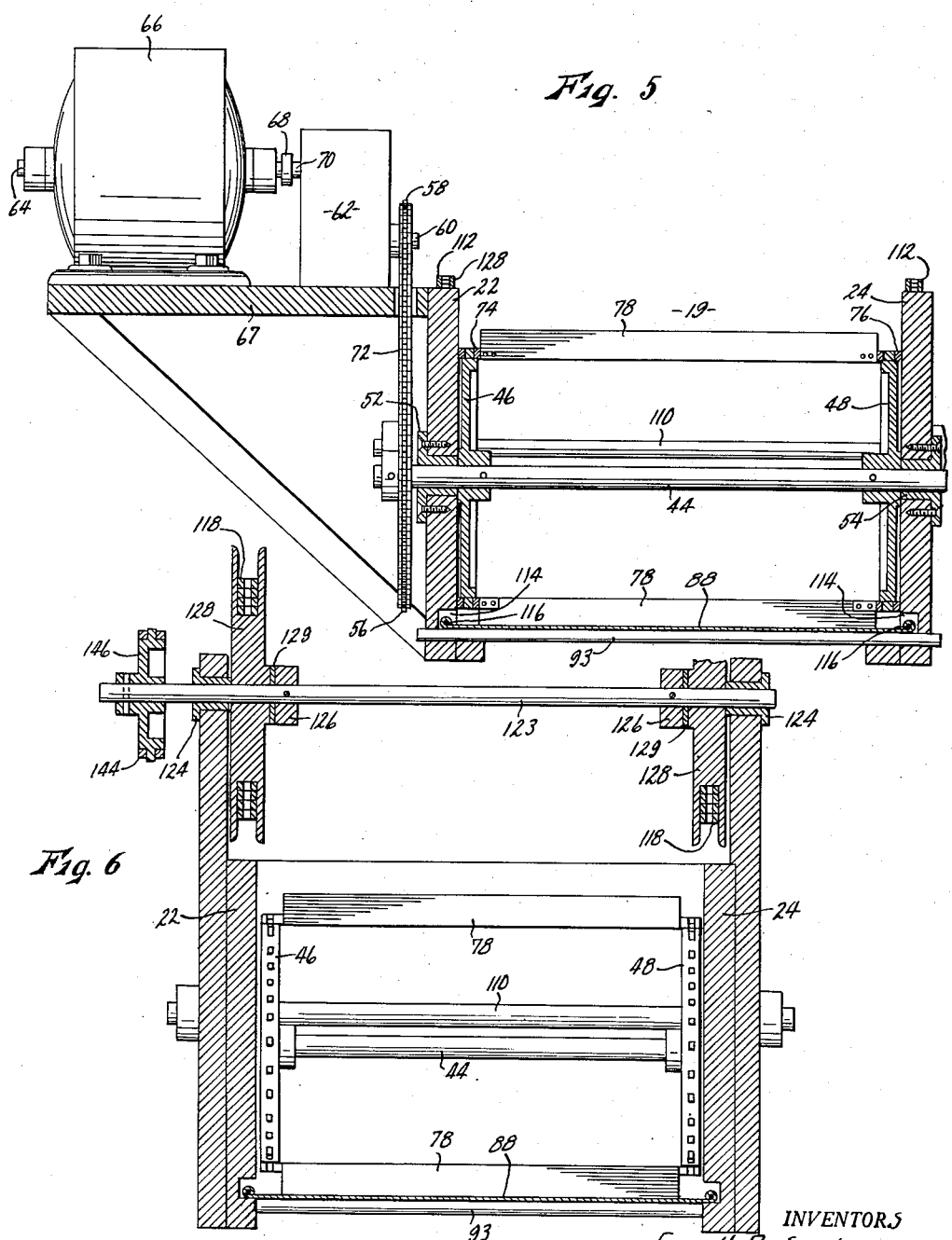

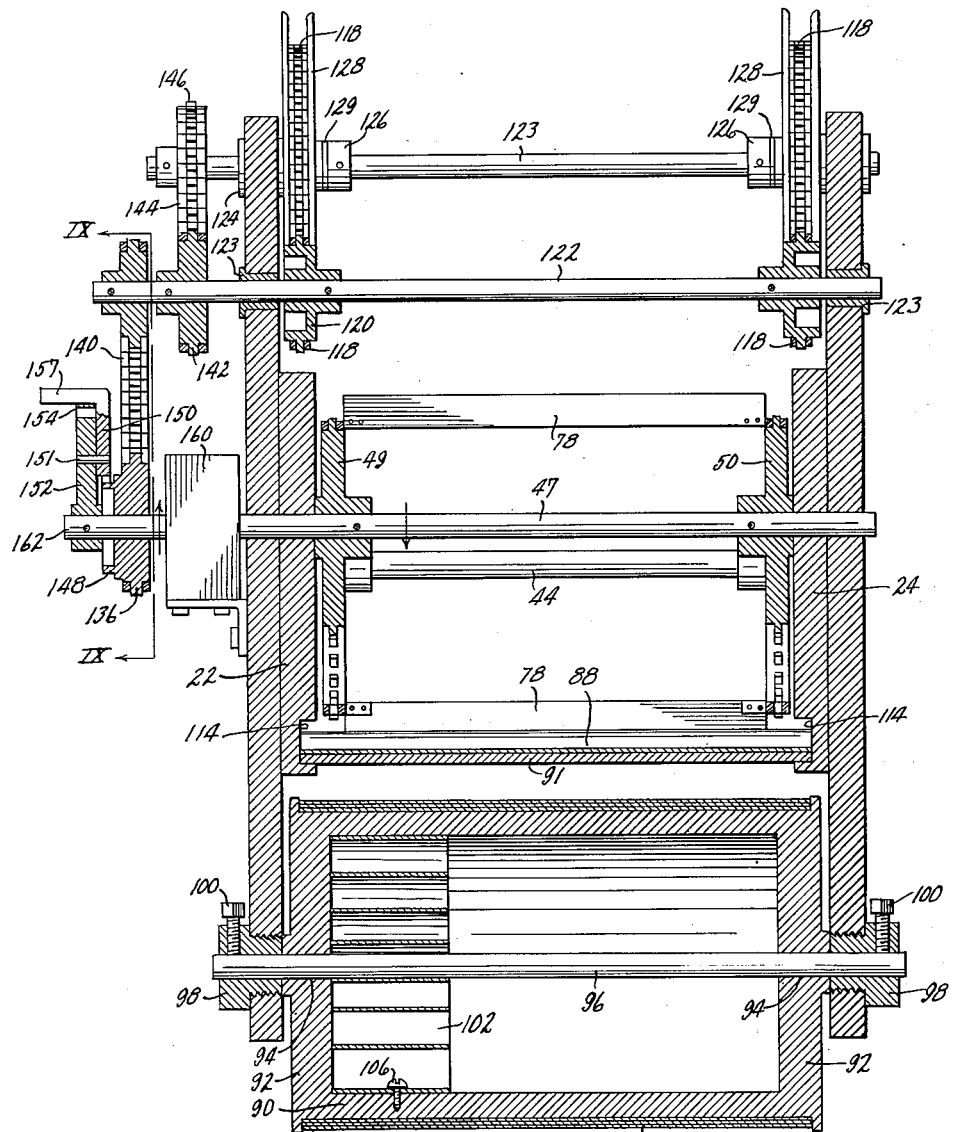

United States Patent Office 2,762,516
Patented Sept. 11, 1956

2,762,516

STOCK FEED TROUGH

Maudie M. Sanders and Everett R. Sanders,
Kansas City, Mo.

Application February 13, 1952, Serial No. 271,382

4 Claims. (Cl. 214—17)

This invention relates to improvements in feed trough filling devices whereby stored feed such as ensilage fed to the device is automatically delivered into a trough to serve as a feeding for a group of stock.

The principal object of this invention is the provision of trough charging device comprising a frame supported above a trough, an adjustably mounted bottom member carried by said frame. A belt conveyor carried by said frame above said bottom member and power means operable to drive said conveyor at a relatively high speed and to drive said bottom member at a relatively low speed in the same general direction.

A further object of the invention is the provision of a feed trough charging device comprising a frame positioned above a feed trough, a bottom member adjustably carried by said frame and normally held in the retracted position by a coiled spring, a motor operable to actuate means to slowly drive the forward edge of said bottom member lengthwise across said feed trough, and a belt conveyor operable by said motor to move at a relatively high rate of speed to move feed positioned on said bottom member therefrom and into the trough positioned therebelow.

Other objects are ease and economy of construction, ease and efficiency of operation, and adapted to be adjusted to deliver variable amounts of feed to the trough.

With these objects in view, as well as other objects which will appear during the course of the specification reference will be had to the drawings wherein:

Fig. 1 is a side elevation of a feeding apparatus showing a stock feeding trough charging device embodying this invention.

Fig. 2 is a plan view of the stock feeding trough charging device shown in Fig. 1.

Fig. 3 is an enlarged, foreshortened plan view of the trough charging device.

Fig. 5 is an enlarged cross sectional view taken on line V—V of Fig. 4.

Fig. 6 is an enlarged fragmentary sectional view taken on line VI—VI of Fig. 4.

Fig. 7 is an enlarged view taken on line VII—VII of Fig. 4.

Fig. 8 is an enlarged horizontal fragmentary sectional view taken on line VIII—VIII of Fig. 4.

Fig. 9 is a sectional view taken on line IX—IX of Fig. 7.

Figure 4:
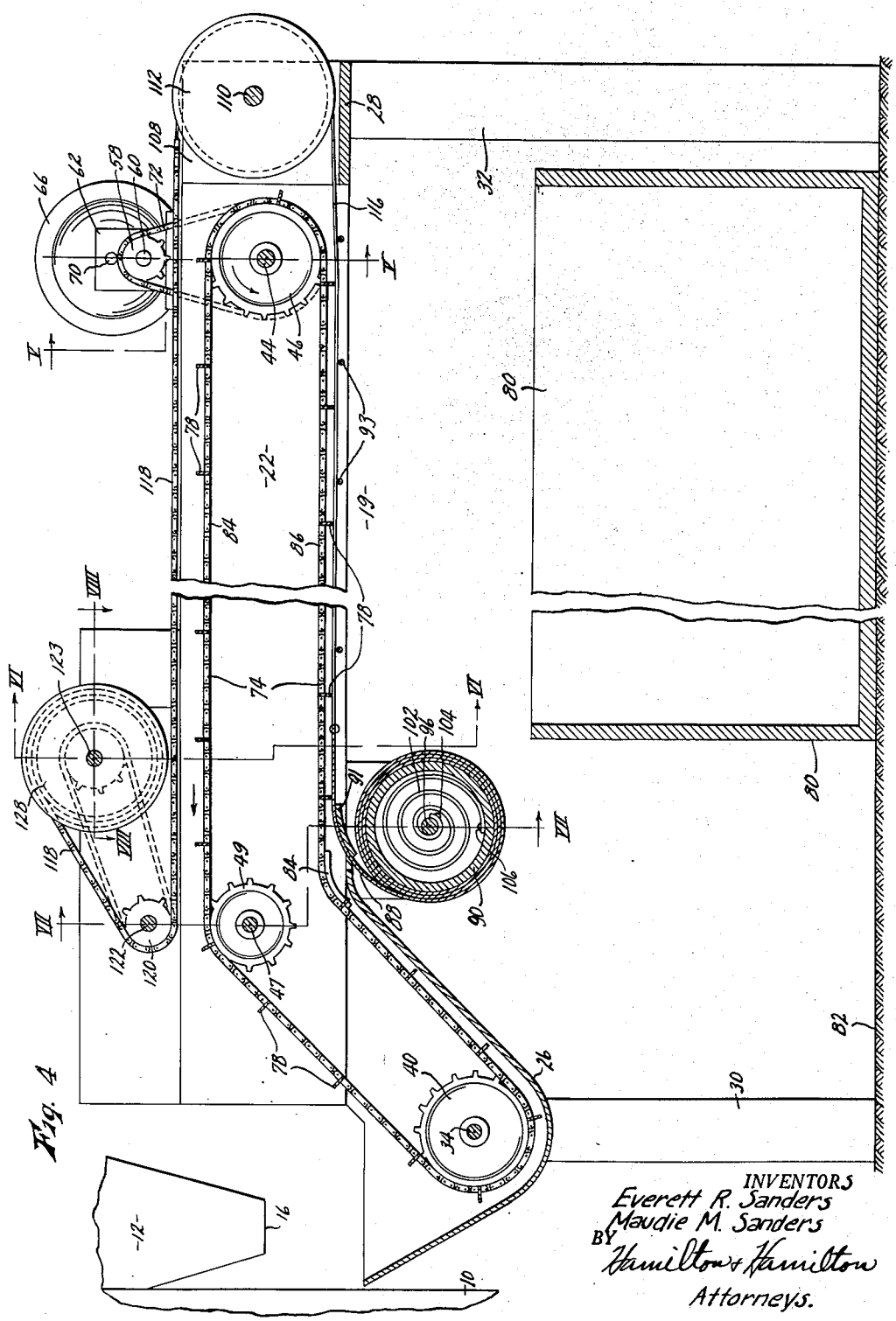
Fig. 4 is a section view taken on line IV—IV of Fig. 3.

Throughout the several views like reference characters refer to similar parts and the numeral 10 designates a silo, bin or any other containers for large quantities of chopped feed or grain.

The silo has a suitable side chute 12 to which the feed is fed through side opening 14 formed in the silo. The lower end portion 16 of chute 12 extends outwardly from the silo to extend over a hopper 18 adapted to receive the feed for delivery to the trough.

A conveyor 19 including a frame 20 having spaced apart side walls 22 and 24 disposed in substantially parallel relation and joined together by transverse sections 26 and 28 which are respectively provided with supporting legs 30 and 32.

The side walls 22 and 24 terminate at their inner ends in a hopper 18 which extends below the main portion of said side walls to receive a transverse shaft 34 mounted in bearings 36 and 38 mounted respectively in walls 22 and 24, and provided adjacent its opposite ends with like sprocket wheels 40 and 42. The outer portions of side walls 22 and 24 are provided with a transverse drive shaft 44 disposed in parallel relation with shaft 34 and provided with a pair of sprocket wheels 46 and 48. In parallel relation with shaft 44 and adjacent the opposite ends of side walls 22 and 24 is a shaft 47 carrying sprocket wheels 49 and 50. Shaft 44 is mounted in bearings 52 and 54 which are respectively mounted in side walls 22 and 24. The end portion of shaft 44 extends outwardly beyond wall 22 and is provided with a sprocket wheel 56 which is in planar alignment with drive sprocket 58 which is mounted on the take off shaft 60 of the gear speed reduction unit 62. Shaft 64 of motor 66 is connected by means of coupling 68 to the drive shaft 70 of the speed reducing unit. Sprocket wheels 58 and 56 are operatively interconnected by sprocket chain 72 to drive shaft 44. Motor 66 and speed reducing unit 62 are carried by shelf 67 rigidly mounted on side wall 22 of frame 10. Endless chain belt 74 is operatively mounted on sprockets 46, 49 and 40 and is driven at a reduced speed by motor 66 through the speed reducing unit 62. A like endless chain belt 76 operatively mounted on sprocket wheels 48, 50 and 42 and operated in conjunction with chain belt 74 to carry transversely disposed flights 78 which are secured thereto to move anticlockwise to move feed from said hopper 18 to be delivered to the trough 80 which is positioned on the ground 82 beneath the conveyor 19. Chain belts 74 and 76 are adapted to slide over slide plates 84 which are secured to side walls 22 and 24 respectively so that the upper and lower reaches 84 and 86 of the conveyor extending from hopper to the outer end of the conveyor are supported in parallel relation to run in opposite directions.

An adjustable bottom member 88 made of a flexible metal strip normally wound on a drum 90 and adapted to be extended gradually above the bottom of the conveyor to regulate the flow of feed from the conveyor 19 to the trough 80.

Drum 90 has end members 92, drilled at 94 to receive an axle 96 which extend through bearing members 98 to which it is securely fixed by means of set screw 100 whereby the axle is secured against rotation. A special spring 102 mounted in drum 99 with its inner end secured to stationary axle 96 at 104 and its outer end secured to the inner peripheral wall of said drum at 106 and is so wound that as the bottom member 88 is unwound from the drum the spring 102 will be wound and serve to rotate the drum in an anticlockwise direction to rewind the strip 88 thereon after the trough has been filled.

Bottom member 88 as it leaves drum 90 moves over the accurate plate 91 which extends across the conveyor to engage side walls 22 and 24. This plate directs the bottom member 88 into grooves 114. It will also be noted that transverse rods 93 having their opposite ends mounted respectively in side walls 22 and 24 are positioned below member 88 to support the load carried thereby. These rods are spaced apart to permit good delivery of the feed therebetween.

Motor 66 serves to feed the bottom member 88 outwardly over trough 80 through the following mechanics. Mounted in the extended ends 108 of side walls 22 and 24 is rotatably mounted shaft 110 disposed in parallel relation to shaft 34 and carrying adjacent its opposite ends grooved pulley wheels 112.

The outer edges of bottom sheet member 88 are mounted in grooves 114 formed in the side walls 22 and 24 and are provided with operating wires 116 which are secured thereto and extend lengthwise of the conveyor over wheels 112 and engage sprocket chains 118 which are substantially parallel with wires 116 and extend rearwardly to a point adjacent shaft 47 to operatively fit about sprocket wheel 120 mounted on shaft 122 which extends transversely across the conveyor and is mounted in bearings 123 fixed in side walls 22 and 24 respectively. Mounted for rotation on shaft 123 and secured against axial movement therealong by set collars 126 is a pair of like grooved sheave wheels 128 which are adapted to receive the chains 118 thereabout. Spring pressure plates 130 mounted in wall members 22 and 24 respectively are mounted to exert a light spring pressure against the face of the respective sheave wheels 128 by the action of springs 132 which act to normally permit the slippage of the sheave wheels 128 which are driven by the rotating shaft 123 through friction plate 129 against the hub of the sheave wheel 128 due to the pressure exerted by the springs 132.

Shaft 47 driven by rotating sprocket wheels 49 and 50 is adapted to drive certain of the parts through a speed reduction box 160 which reduces the speed of rotation of a take off shaft 162 from the reduction box 160 and also reverses its direction of rotation to the direction of rotation of shaft 47.

Referring to Figs. 7 and 9 it will be noted that sprocket wheel 136 is provided with a series of ratchet teeth 148, is loosely mounted on takeoff shaft 162, is driven by a pawl 150 which is pivoted at 151 to a collar 152 which is pinned at 153 to shaft 162 to rotate therewith. The outer portion of collar 152 is made arcuate about pivot 151 to receive spring 154 which is attached thereto by pin 155. Spring 154 is provided with a depression 156 wherein the transversely projecting arm 157 rests to secure the pawl in the ratchet engaging position, another spaced depression 158 formed in spring 154 is adapted to receive arm 157 to secure the pawl in the ratchet disengaging position so that the direction of rotation of sprocket wheel 136 can be reversed. Sprocket wheel 136 is operatively connected with sprocket wheel 136 by means of chain 140 to drive shaft 122. Another sprocket wheel 142 fixed to shaft 122 is operatively interconnected by chain 144 to sprocket wheel 146 which is pinned to shaft 123. This mechanism just described provides for the proper handling of chains 118 to insure their proper positioning during the winding and unwinding of said chains, furthermore the desired relative speeds of the bottom member and the conveyor belt can be had to provide for the delivery of any desired quantity of feed.

What we claim as new and desire to protect by Letters Patent is:

1. A feed trough charging device comprising a frame, having spaced apart side walls, a bottom member adjustably carried by said frame means continuously urging said bottom to a retracted position at one end of said feed trough, power means operable to move the forward edge of said bottom member lengthwise across said trough at a slow rate of speed, a conveyor operable by said power means to move at a relatively high rate of speed to move feed positioner on said bottom member therefrom and into the feed trough, and a disengageable clutch in the driving connection to said bottom.

2. A feed trough charging device comprising a frame adapted to be positioned above a feed trough, an imperforate bottom carried movably by said frame, power means operable to drive said bottom whereby the leading edge thereof is caused to traverse the length of said trough, a conveyor carried movably by said frame and including flights disposed in sliding relation with the upper surface of said bottom to form compartments in conjunction therewith adapted to receive feed therein, means operable to drive said conveyor in the same direction as said bottom but at a greater speed, resilient means urging said bottom toward its original position, and a disengageable clutch in the driving connection to said bottom.

3. A feed trough charging device comprising a frame adapted to be positioned above a feed trough, an imperforate bottom carried movably by said frame, resilient means urging said bottom in one direction longitudinally of said trough, a conveyor carried movably by said frame and including flights disposed in sliding relation with the upper surface of said bottom to form compartments in conjunction therewith adapted to receive feed, power means operable to drive said bottom in a direction opposite to the force of said resilient means whereby the leading edge of said bottom is caused to traverse the length of said trough, and whereby said conveyor is driven in the same direction as said bottom but at a greater speed, and a disengageable clutch in the driving connection to said bottom.

4. A feed trough charging device comprising a frame adapted to be positioned above a feed trough, a drum carried rotatably by said frame, an imperforate flexible bottom adapted to be wound on said drum, spring means biasing said drum to wind said bottom thereon, power means operable to unwind said bottom from said drum whereby the leading edge of said bottom is caused to traverse the length of said trough, a conveyor carried movably by said frame and including flights transverse to the direction of travel of said bottom and in sliding contact with the upper surface thereof to form compartments adapted to receive feed, said power means being operable to drive said conveyor in the same direction as said bottom but at a higher speed, whereby feed is discharged over the leading edge of said bottom to said trough, and a disengageable clutch in the driving connection to said bottom, whereby when said clutch is released said bottom will be returned to its original position by said spring means.

References Cited in the file of this patent

UNITED STATES PATENTS 1,014,786     Tewksbury _____ Jan. 16, 1912